United States Patent [19]

Slavin et al.

[11] Patent Number: 4,947,968

[45] Date of Patent: Aug. 14, 1990

[54] TRANSMISSION MOUNTED SOLENOID INTERLOCK DEVICE

[75] Inventors: Michael Slavin, Caseville; Charles A. Detweiler, Durand; Ellsworth S. Miller, Rochester Hills; Charles R. Martus, Troy, all of Mich.

[73] Assignee: Lectron Products, Inc., Rochester Hills, Mich.

[21] Appl. No.: 345,788

[22] Filed: May 1, 1989

[51] Int. Cl.[5] .................... B60K 41/26; B60K 41/28
[52] U.S. Cl. .................... 192/4 A; 70/248; 70/282; 74/483 R; 74/878; 335/255
[58] Field of Search ............ 74/483 R, 878; 192/4 A; 70/245, 247, 248, 282; 292/201; 335/255

[56] References Cited

U.S. PATENT DOCUMENTS

| 2,808,918 | 10/1957 | Shepard, Jr. et al. | 292/201 X |
| 2,890,581 | 6/1959 | Lewis | 192/4 A X |
| 3,942,614 | 3/1976 | Thompson | 192/4 A |
| 4,473,141 | 9/1984 | Mochida | 192/4 A X |
| 4,631,984 | 12/1986 | Jones | 74/878 |
| 4,807,454 | 2/1989 | Sengupta et al. | 70/277 |

FOREIGN PATENT DOCUMENTS 1203756  4/1986  Canada ................. 192/4 A

Primary Examiner—Allan D. Herrmann
Attorney, Agent, or Firm—Harness, Dickey & Pierce

[57] ABSTRACT

An electrically controlled transmission shift interlock device. The device provides interlock capability by locking the pivotable shift actuating lever which is operatively associated with the transmission. A transmission mounted solenoid is provided having a moving armature coupled to a locking member which, when energized, positions the locking member into interlocking engagement within an engaging notch provided in the shift actuating lever. The device includes means for proper alignment of the interlocking components during installation of the interlock device onto the transmission. One alternate embodiment further provides means for having interlocking capabilities at more than one gear shift lever position. Another embodiment causes the transmission actuating lever to lock when the solenoid is de-energized and is movable upon energization.

7 Claims, 4 Drawing Sheets

TRANSMISSION MOUNTED SOLENOID INTERLOCK DEVICE

BACKGROUND AND SUMMARY OF THE INVENTION

This invention relates to a lever locking device and particularly to a transmission shift lever locking device for motor vehicle applications.

Automobile manufacturers are evaluating devices which lock automatic transmission shift levers in certain operating modes. This invention is directed toward a design for such a shift lever interlock device. The present invention employs an electrically energized solenoid coupled to a pivotable locking member which is mounted on the outer transmission housing in close proximity to a transmission mounted shift actuating lever. The transmission mounted shift actuating lever is coupled to an operator actuated gear shift lever through remote actuation means such as a cable, rigid linkage or any other known method. The solenoid locking member engages a slotted engaging notch on the shift actuating lever which prevents the gear selection from being changed, for example, out of the "park" position. The solenoid locking member can be activated to disengage the engaging notch, thereby permitting free movement of the shift actuating lever. The system can be designed to lock the shift actuating lever when the solenoid is energized or de-energized, depending on the requirements of the vehicle manufacturer.

In accordance with a preferred embodiment of the present invention, means for properly locating the solenoid interlock device during installation are provided to allow orientation and alignment of the locking member. The locking member must be aligned to properly engage the engaging notch of the shift actuating lever when the vehicle transmission is set in the park (or other) position.

Additional benefits and advantages of the present invention will become apparent to those skilled in the art to which this invention relates from the subsequent description of the preferred embodiments and the appended claims, taken in conjunction with the accompanying drawings.

DETAILED DESCRIPTION OF THE INVENTION

Figure 1:
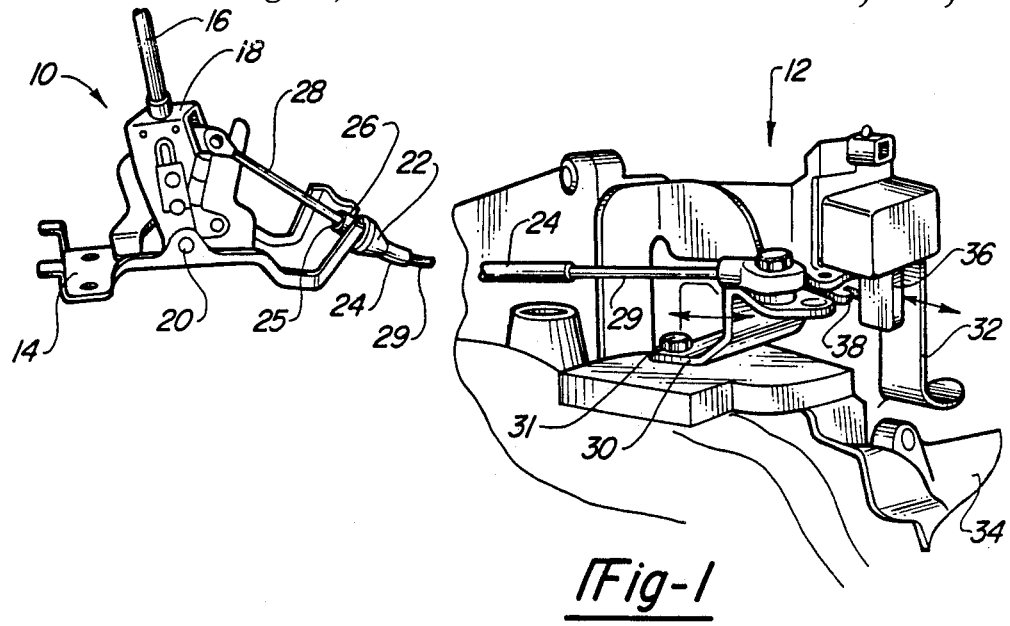
FIG. 1 is a pictorial view of a shifter assembly of an illustrative motor vehicle showing an operator actuated gear shift lever coupled to a transmission mounted shift actuating lever via cable actuation means.

FIG. 1 illustrates a motor vehicle automatic transmission shifter assembly 10 in operative association with a transmission mounted solenoid interlock device 12 in accordance with this invention. Shifter assembly 10 includes mounting plate 14 for mounting on the floor pan of a motor vehicle. Gear shift lever 16 is pivotable through a limited angular range with various angular positions corresponding to a particular transmission gear selection. Gear shift lever 16 is mounted to clevis 18 which is pinned for rotation with respect to plate 14 by clevis pin 20.

Automatic transmission shifter assembly 10 and solenoid interlock device 12 are shown to be operatively associated through actuation cable assembly 22 which couples shifter assembly 10 to a pivotable transmission mounted shift actuating lever 30. Transmission shift cable assembly 22 includes an outer sheath 24 with an end fitting 25 which is supported by plate 14 at restraining notch 26. Shift cable rod 28 attached to an end of cable core 29 is affixed to clevis 18 via pin 27 such that arcuate motion of gear shift lever 16 causes the rod to be moved in and out of outer sheath 24. Shifter assembly 10 would further include (not shown) some means for indicating to the operator the transmission selection position at which gear shift lever 16 is set. Such indicia can be provided, for example, in the form of a labeled elongated slot through which gear shift lever 16 passes, or through remotely actuated shift indicator devices which are well known according to the prior art. The opposite end of cable assembly 22 is coupled to the vehicle's automatic transmission. At the transmission, a bracket (not shown) is provided which restrains outer sheath 24, whereas cable inner core 29 is coupled to pivotable transmission mounted shift actuating lever 30. Axial motion of cable inner core 29 within outer sheath 24 translates into pivotable motion of shift actuating lever 30 through a limited angular range directly corresponding to a particular transmission gear selection via gear shift lever 16. It would alternatively be possible to provide a transmission with a linearly actuated shift lever or rod (not shown). Movement of transmission mounted shift actuating lever 30 is communicated to the transmission via a shaft 31, extending through the transmission and coupled at its outermost end to shift actuating lever 30. Rotation of shaft 21 communicates the gear selected via gear shift lever 16 to the transmission.

It is contemplated that transmission mounted solenoid interlock device 12 is adaptable for application without regard to the type of remote actuation means utilized to move the shift actuating lever. Actuation means such as rod-type linkages, rotary cables, etc. are examples of methods other than linear actuation cables which could be readily utilized.

In accordance with a principal feature of this invention, a solenoid interlock device 12 is provided which activates a pivotable locking member 36 which provides the interlock function such that shift actuating lever 30 is restrained at a particular position from motion by engagement of the locking member 36 with a lock engaging slot 38 formed in shift actuating lever 30, until the device is released. Solenoid interlock device 12 is secured to a substantially U-shaped mounting bracket 32 which is mounted to outer transmission housing 34.

Figure 2:
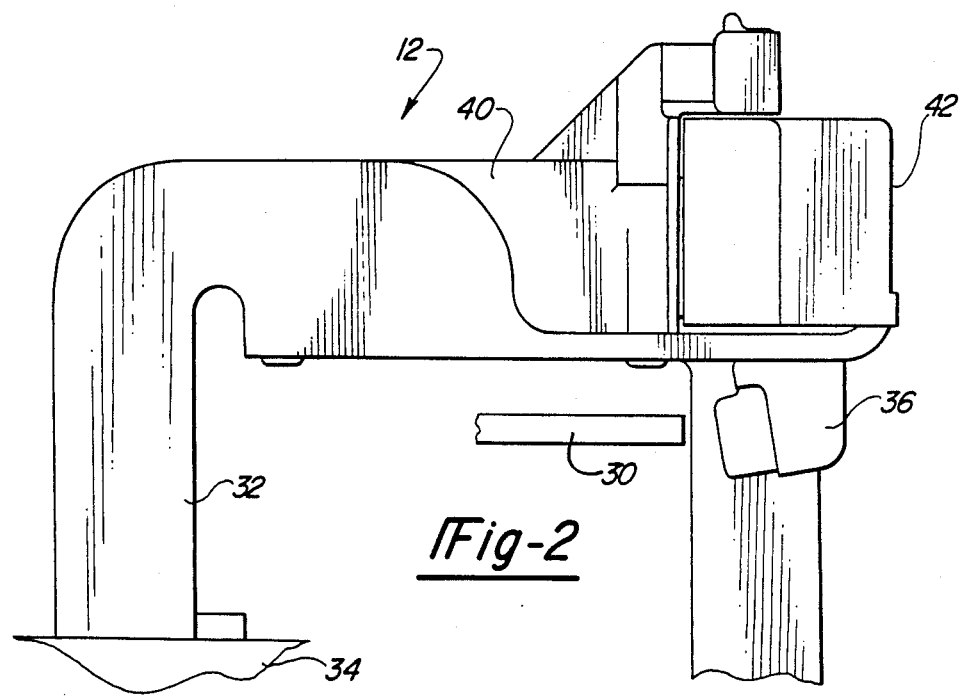
FIG. 2 is a side elevational view of the transmission mounted solenoid interlock device according to a first embodiment of this invention as shown in FIG. 1.
Figure 3:
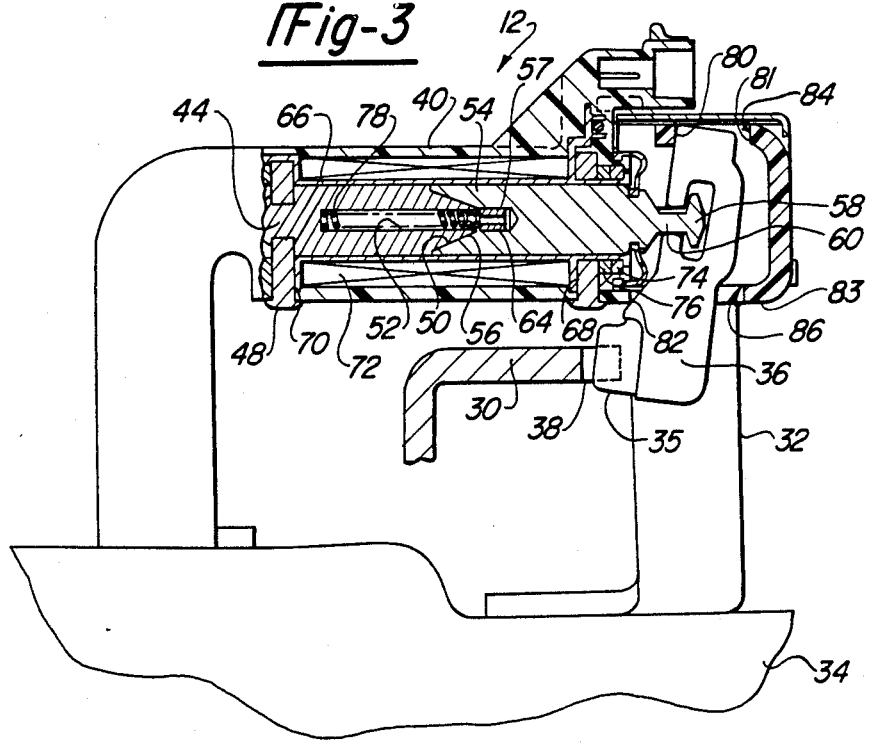
FIG. 3 is a partially sectional view of FIG. 2 showing details of the internal components of the solenoid interlock device and the locking member in their energized "locked" position.
Figure 4:
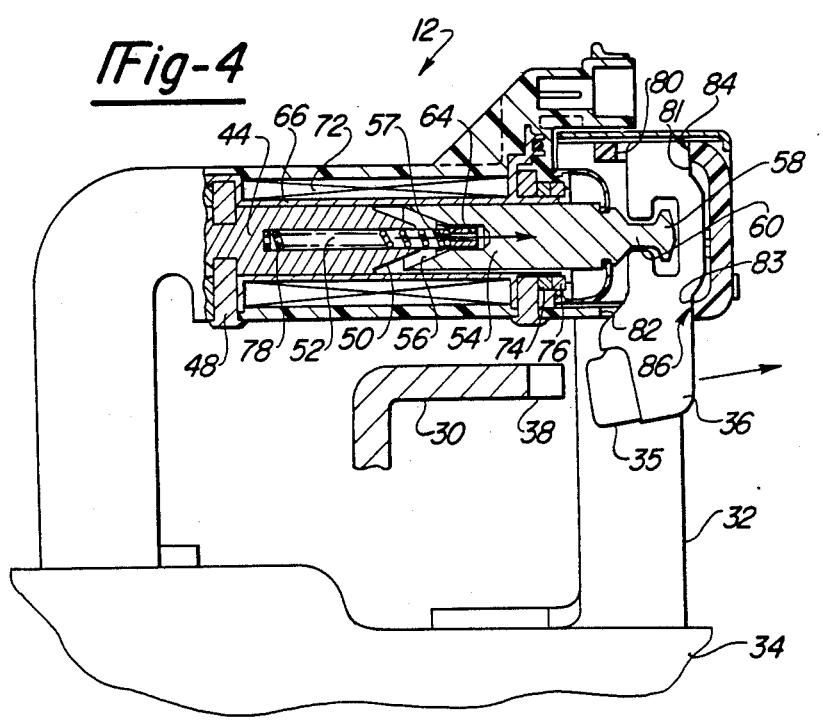
FIG. 4 is similar to FIG. 3 except for showing the internal components of the solenoid interlock device and the locking member in their de-energized "unlocked" position.

With particular reference to FIGS. 2, 3 and 4, the components making up solenoid interlock device 12 and the locked and unlocked relative angular positioning of the locking member 36 and shift actuating lever 30 are shown. Solenoid interlock device 12 is structurally designed to protect the working components therein from the severe environment beneath the vehicle's floor pan where it is subject to corrosives, severe vibration and thermal stresses. Specifically, housing 40, cover 42, bracket 32 and locking member 36 are coated with an anti-corrosion material and assembled so as to reduce the effects of the severe environment encountered. Pole piece 44 is fixedly mounted within housing 40. Pole piece 44 is staked to a radially extending flange 48 which acts as a flux collector at one of its axial ends and forms a convex frusto-conical surface 50 at its opposite end. Axially extending passage 52 is provided within pole piece 44 at its end adjacent surface 50.

Armature 54 is movable in an axial direction through a limited range of motion within housing 40 and defines a concave frusto-conical surface 56 which corresponds in shape to that of pole piece surface 50. Additionally, axial passage 57 is formed within armature 54 at its end adjacent surface 56 such that passages 52 and 57 are axially aligned. Noise damper 64 is disposed within axial passage 57. Armature 54 further defines an annular extension 58 having a necked portion 60 provided for coupling locking member 36 to armature 54. Coil bobbin 66 encircles pole piece 44 and armature 54, and forms a pair of axially separated flanges 68 and 70 which confine and support bobbin 66. Flux collector rings 74 and 76 are positioned adjacent bobbin 66. Return spring 78 is disposed within axial passages 52 and 57, and biases armature 54 away from pole piece 44.

Shift actuating lever 30 engaging slot 38 is positioned to be aligned with engaging portion 35 of interlocking member 36 when the transmission is set in the park position. Engaging portion 35 of locking member 36 enters slot 38 to provide the interlockig function as will be described hereinafter.

FIG. 3 illustrates the orientation and cooperation of elements of solenoid interlock device 12 when winding 72 is energized which causes the transmission to be locked in the park position. As shown, armature 54 is drawn toward pole piece 44 by the induced magnetic field from winding 72. The tapered working air gap provided by the frusto-conical surfaces 50 and 56 provides a desired level of attractive force of armature 54 over a fairly long stroke distance of the armature. However, it is contemplated that other working air gap configurations such as planar air gaps could be utilized. In the position shown in FIG. 3, the energized solenoid interlock device 12 acts to pivot locking member 36 against wall surfaces 80 and 82 of access slots 84 and 86, respectively, provided through mounting bracket 32. Engaging portion 35 of locking member 36 is thereby positioned within engaging slot 38 such that shift actuating lever 30 is interlockingly restrained from moving from the park gear position until the solenoid is de-energized. Solenoid interlock device 12 is designed such that forces imposed by shift actuating lever 30 onto the device do not directly load armature 54. This design provides compactness and structural efficiency for the overall structure.

FIG. 4 illustrates the orientation and cooperation of elements of solenoid interlock device 12 when winding 72 is de-energized so as to unlock the transmission from the park position. Upon interruption of electrical current to winding 72 caused, for example, by the operator depressing the vehicle's brake pedal, the magnetic attraction between pole piece 44 and armature 54 is relieved and the biasing force of spring 78 is allowed to move armature 54 away from pole piece 44. Once armature 54 is fully extended away from pole piece 44, pivotable locking member 36 is outwardly positioned so as to seat against the rearward surface 81 and 83 of respective access slots 84 and 86. In this position, locking member 36 is no longer interlockingly engaging the engaging slot 38 of shift actuating lever 30, thereby allowing pivotable motion of shift actuating lever 30 via actuation of cable assembly 22 through the desired arcuate motion of gear shift lever 16.

Figure 5:
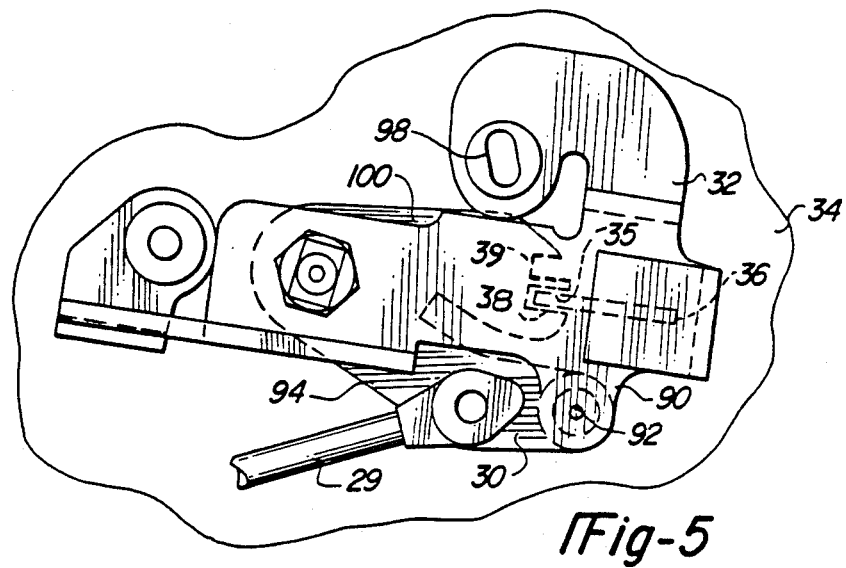
FIG. 5 is a plan view of a transmission mounted solenoid interlock device and shift actuating lever aligned in the interlocked position and showing the installation assisting features incorporated in this invention.
Figure 6:
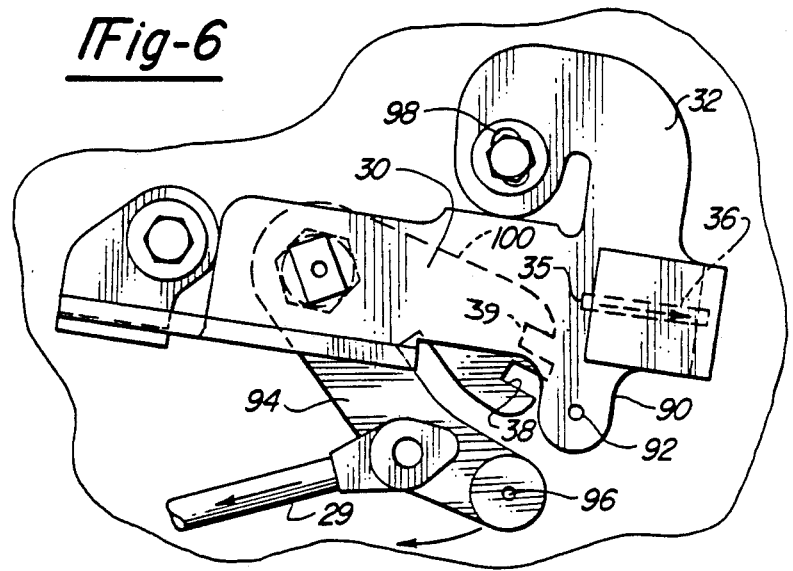
FIG. 6 is similar to FIG. 5 but shows the rotation of the shift actuating lever relative to the solenoid interlock device to a transmission gear position other than park.

With particular reference to FIG. 5 and 6, the locked and unlocked positions of the present invention are respectively presented. For proper installation positioning of the interlocking components installation, alignment means are provided. According to a preferred embodiment of this invention, installation alignment is provided by a pinning extension surface 90 on mounting bracket 32 having a bore 92 extending therethrough. Pivotable shift actuating lever 30 further defines a two legged member wherein a first leg 94, coupled to shift cable core 29, has a pinning bore 96 alignable with mounting bracket pinning hole 90 upon interlocking orientation of engagement slot 38 and engaging section 35 of locking member 36. The installation alignment means effectively locate the park position for installation of the solenoid interlock device 12 to the transmission housing 34. Alternatively, lever 30 could be formed as a simple intergral shape without distinct legs as described above.

Mounting bracket hole 98 is slotted such that tolerance variations in the transmission housing 34 and the mounting bracket 32 can be readily accommodated. Subsequent to securing solenoid interlock device 12 in proper alignment to transmission housing 34, adjustment of the remote actuation means (i.e., cable assembly 22) accommodates tolerance variations in the vehicle so as to synchronize the positions of gear shift lever 16 and transmission shift actuation lever 30. The second leg 100 of shift actuating lever 30 includes the engaging slot 38. Upon release of locking member 36 from engaging slot 38, shift actuating lever 30 is capable of a range of pivotable motion corresponding to arcuate motion of gear shift lever 16 as selected by the vehicle operator.

The solenoid interlock device 12 according to the first embodiment of this invention is provided with a failure mode adapted to permit shifting of a transmission upon failure of the vehicle's electrical system. Solenoid interlock device 12 is actuated upon energization of the windings 72. Energization of windings 72 is provided via an electrical current supplied by energization of the automobile ignition system upon starting, thereby preventing interlocked actuation of the solenoid interlock device 12 whenever the vehicle is not running or upon failure of the electrical circuit controlling the device.

It is contemplated that pivotable actuation lever 30 could further incorporate an additional engaging slot 39 so as to enable solenoid interlock device 12 to lock at two positions, thus enabling the manufacturer to provide interlocking capability operable at either the neutral or park positions.

Figure 7:
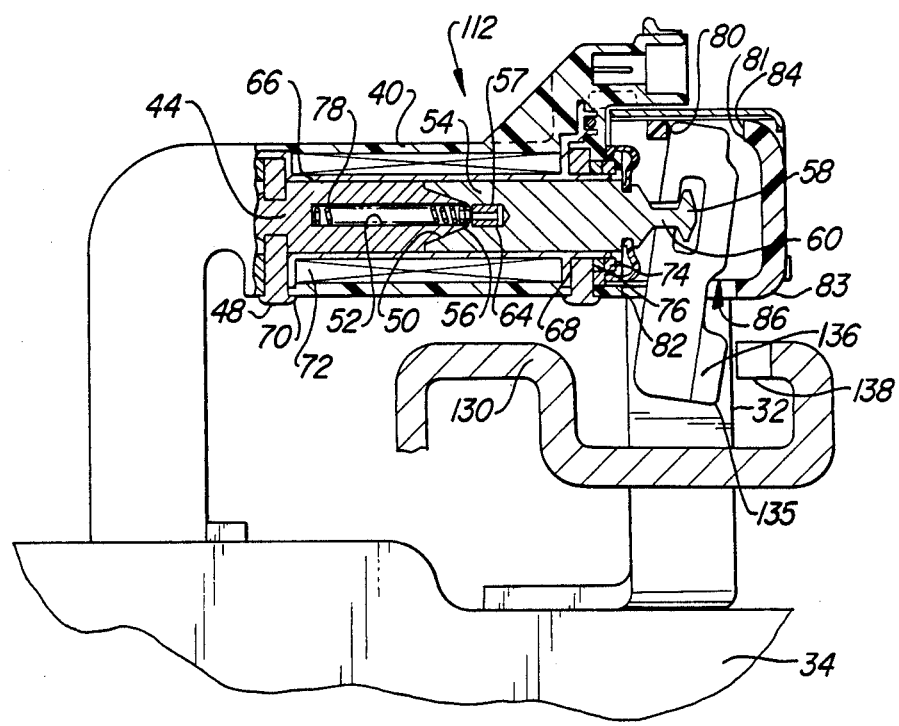
FIG. 7 is a partial sectional view of a solenoid interlock device according to a second embodiment of this invention in which the transmission mounted shift actuating lever is locked when the solenoid is de-energized and unlocked when the solenoid becomes energized.

FIG. 7 illustrates an alternate embodiment of this invention which is generally designated by reference number 112. This embodiment is substantially identical to that previously described with the exception that is is configured to lock transmission shift actuation lever 130 upon de-energization of solenoid winding 72. For this embodiment, shift actuating lever 130 is extended such that it engages modified locking member engaging portion 135 when it is moved from the position shown to its rightmost position. In the engaged position, engaging portion 135 meshes with engaging slot 138 as described previously. In all other respects, solenoid interlock device 112 is identical to that described previously and identical components are designated by like reference numbers.

While the above description constitutes the preferred embodiment of the present invention, it will be appreciated that the invention is acceptable to modification, variation and change without departing from the proper scope and fair meaning of the accompanying claims.

We claim:

1. A transmission solenoid interlock device for motor vehicle having a pivotable transmission mounted shift actuating lever remotely coupled to an operator actuated gear shift lever, comprising:
   a mounting bracket adapted to be secured to an outer surface of a transmission in close proximity to said shift actuating lever;
   a tubular housing secured to said mounting bracket;
   a pole piece axially disposed within said housing;
   an armature axially disposed within said housing and movable between a first position displaced from said pole piece to a second position attracted toward said pole piece;
   a solenoid winding attracting said armature to said second position through energization of said winding;
   a locking member operatively coupled for pivotable motion with said armature so as to engage at least one engaging notch provided in said shift actuating lever when said armature is in said second position;
   spring means urging said armature to said first position; and
   installation alignment means associated with said mounting bracket for permitting alignment of said locking member and said at least one engaging notch without energization of said solenoid winding.

2. A transmission solenoid interlock device of claim 1 wherein said shift actuating lever has two engaging notches corresponding to a park and neutral setting of said transmission and said gear shift lever.

3. A transmission solenoid interlock device according to claim 1 wherein said installation alignment means comprises a positioning hole provided on said mounting bracket and a corresponding positioning hole provided on said shift actuating lever such that alignment of said respective positioning holes, and the subsequent pinning therethrough, defines an interlocked transmission park or neutral position, thereby permitting proper alignment of said locking member relative to said at least one engaging notch without energization of said device.

4. A transmission solenoid interlock device for a motor vehicle having a pivotable transmission mounted shift actuating lever remotely coupled to an operator actuated gear shift lever, comprising:
   a tubular housing;
   a pole piece axially disposed within said tubular housing;
   an armature axially disposed within said tubular housing and axially movable between a first position displaced from said pole piece and a second position attracted toward said pole piece;
   a solenoid winding encircling said pole piece and said armature within said housing and urging said armature toward said second position when energized;
   biasing means for urging said armature toward said first position;
   a locking member operatively coupled to said armature such that said locking member is pivotably rotated toward said shift actuating lever when said armature is in said second position thereby positioning said locking member is interlocking engagement with at least one engaging notch provided in said shift actuating lever, and wherein said locking member is pivotably rotated away from said shift actuating lever when said armature is in said first position so as to disengage said locking member from said at least one engaging notch thereby permitting pivotable movement of said shift actuating lever upon corresponding actuation of said operator actuated gear shift lever;
   wherein said interlocking engagement of said locking member with said at least one engaging notch of said shift actuating lever corresponds to a park or neutral setting of said transmission and said gear shift lever;
   mounting means for securing said solenoid interlock device to a transmission abjacent said transmission mounted shift actuating lever; and
   installation alignment means for providing proper alignment of said locking member and said at least one engaging notch without energization of said device.

5. A transmission solenoid interlock device according to claim 4 wherein said alignment means comprising a positioning hole provided on said mounting means and a corresponding positioning hole provided on said shift actuating lever such that alignment of said respective positioning holes, and the subsequent pinning therethrough, defines an interlocked transmission park or neutral position, thereby permitting proper alignment of said locking member relative to said at least one engaging notch without energization of said device.

6. An automatic transmission solenoid interlock device for a motor vehicle having a pivotable transmission mounted shift actuating lever remotely coupled to an operator actuated gear shift lever, comprising:
   a pole piece having a passage axially extending through its convex frusto-conical end surface;
   an axially movable armature having an axial passage extending through its concave frusto-conical end surface thereby defining a spring holder between said frusto-coical surface of said respective pole piece and armature;
   a solenoid winding encircling said pole piece and said armature urging said armature to an axial position attracted toward said pole piece when said winding is energized;
   spring means disposed within said spring holder for urging said armature to an axial position away from said pole piece when said windings are de-energized;

a pivotable locking member coupled to said armature for inibiting pivotal motion of said transmission mounted shift actuating lever when said armature is energized and permitting pivotal motion of said transmission mounted shift actuation lever when said armature is de-energized;

an engaging slot formed in said tranmission mounted shift actuating lever for interlockingly capturing said locking member when said windings are energized and permitting disengagement upon de-energization, said engaging slot located on said shift actuating lever so as to correspond with a park position of said transmission and said operator actuated gear shift lever, and whereby, axial motion of said armature toward said pole piece upon energization of said windings produces pivotable rotation of said locking member into said engaging slot of said transmission mounted shift actuating lever so as to interlock said gear shift lever in said park position, thereby requiring interruption of said energized windings prior to permitting a transmission gear selection other than said park position.

7. An automatic transmission solenoid interlock device according to claim 6 further comprising installation alignment means, said alignment means comprising a positioning hole provided on said solenoid interlock device and a corresponding positioning hole provided on said shift actuating lever such that alignment of the respective positioning holes, and the subsequent pinning therebetween, defines an interlocked transmission park position, thereby permitting proper alignment of said pivotable locking member and said engaging slot provided in said shift actuating lever without energization of said device.

* * * * *